(12) United States Patent
Gregory et al.

(10) Patent No.: US 10,962,129 B2
(45) Date of Patent: Mar. 30, 2021

(54) METHODS AND SYSTEMS FOR A COOLING SYSTEM VALVE

(71) Applicant: Ford Global Technologies, LLC, Dearborn, MI (US)

(72) Inventors: Jonathan Gregory, Colchester (GB); Bernd Steiner, Bergisch Gladbach (DE); Jan Mehring, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 16/354,079

(22) Filed: Mar. 14, 2019

(65) Prior Publication Data
US 2019/0331244 A1     Oct. 31, 2019

(30) Foreign Application Priority Data

Apr. 26, 2018   (GB) ..................................... 1806831

(51) Int. Cl.
*F16K 17/38*      (2006.01)
*F16K 49/00*      (2006.01)
(Continued)

(52) U.S. Cl.
CPC .......... *F16K 17/383* (2013.01); *F16K 49/002* (2013.01); *F01P 7/14* (2013.01);
(Continued)

(58) Field of Classification Search
CPC ...... F16K 17/383; F16K 49/002; F16K 13/04; F16K 31/025; F16K 31/002; F16K 1/222;
(Continued)

(56) References Cited

U.S. PATENT DOCUMENTS 2,137,882  A  *  11/1938  Nelson .................. F16K 17/383
                                                       137/73
2,293,913  A      8/1942  Munson
(Continued)

FOREIGN PATENT DOCUMENTS

DE           3316429  A1    11/1984
JP        2013160355  A       8/2013
(Continued)

OTHER PUBLICATIONS

Great Britain Intellectual Property Office, Combined Search and Examination Report under Sections 17 and 18(3) Issued in Application No. GB1806831.2, Sep. 27, 2018, 6 pages.

*Primary Examiner* — Minh Q Le
(74) *Attorney, Agent, or Firm* — Geoffrey Brumbaugh; McCoy Russell LLP

(57) ABSTRACT

Methods and systems are provided for a cooling system valve comprising a fusible insert and a heating element coupled to the insert. In one example, in response to an increase in coolant temperature to above a first threshold temperature, a movable element of the cooling system valve may be actuated to a fully open position and in response to an increase in coolant temperature to above a second threshold temperature with the movable element in a fully open position, electric current may be routed through the heating element to heat and melt the fusible insert. By melting the fusible portion, coolant may flow through an opening created in the movable element.

16 Claims, 7 Drawing Sheets

(51) Int. Cl.
  *F16K 31/00* (2006.01)
  *F01P 7/14* (2006.01)
  *F01P 11/16* (2006.01)
  *F16K 31/02* (2006.01)
  *F01P 11/00* (2006.01)
  *F16K 1/22* (2006.01)
  *F16K 17/40* (2006.01)

(52) U.S. Cl.
  CPC ............... *F01P 11/00* (2013.01); *F01P 11/16* (2013.01); *F16K 1/222* (2013.01); *F16K 13/04* (2013.01); *F16K 31/002* (2013.01); *F16K 31/025* (2013.01)

(58) Field of Classification Search
  CPC ........ F01P 11/16; F01P 11/00; F01P 2031/32; F01P 7/14; F01P 7/165; F01P 7/16; F01P 2007/146
  USPC ............... 137/74, 68.12, 68.11, 68.14, 487.5
  See application file for complete search history.

(56) References Cited

U.S. PATENT DOCUMENTS

| | | | | |
|---|---|---|---|---|
| 2,701,755 A | * | 2/1955 | Strasser | C10J 3/74 48/78 |
| 2,998,018 A | * | 8/1961 | Beck | F16K 17/383 137/74 |
| 3,065,630 A | * | 11/1962 | Jensen | F01P 7/16 73/40 |
| 4,267,854 A | | 5/1981 | Naab et al. | |
| 4,744,383 A | * | 5/1988 | Visnic | F16K 17/383 137/72 |
| 5,174,496 A | | 12/1992 | Bourgin | |
| 5,361,980 A | | 11/1994 | Stout | |
| 5,694,897 A | * | 12/1997 | Kaji | F01P 11/14 123/339.15 |
| 6,044,808 A | | 4/2000 | Hollis | |
| 6,296,007 B1 | * | 10/2001 | Cifune | F16K 1/22 137/15.25 |
| 10,018,103 B2 | * | 7/2018 | Ito | F01P 11/16 |
| 2007/0175414 A1 | * | 8/2007 | Miyahara | F02B 77/082 123/41.1 |
| 2009/0114868 A1 | * | 5/2009 | Lee | F16K 39/028 251/305 |
| 2014/0034741 A1 | | 2/2014 | Schwartz et al. | |
| 2014/0079568 A1 | | 3/2014 | Tarnowski | |
| 2014/0174545 A1 | * | 6/2014 | Franz | F16K 17/38 137/2 |
| 2014/0217313 A1 | * | 8/2014 | Killinger | F16K 31/025 251/11 |
| 2015/0252911 A1 | | 9/2015 | Kojima et al. | |
| 2017/0058753 A1 | * | 3/2017 | Lee | F16K 11/165 |
| 2017/0314455 A1 | * | 11/2017 | Rejeti | F01P 11/18 |

FOREIGN PATENT DOCUMENTS

| | | |
|---|---|---|
| KR | 101832162 B1 | 3/2018 |
| WO | 2010063037 A1 | 6/2010 |
| WO | 2010112402 A1 | 10/2010 |

* cited by examiner

METHODS AND SYSTEMS FOR A COOLING SYSTEM VALVE

CROSS REFERENCE TO RELATED APPLICATION

This application claims priority to Great Britain Patent Application No. 1806831.2, filed Apr. 26, 2018. The entire contents of the above-referenced application are hereby incorporated by reference in their entirety for all purposes.

FIELD

This disclosure relates generally to methods and systems for a cooling system valve comprising a fusible portion coupled to a heating element.

BACKGROUND/SUMMERY

In automotive thermal management, coolant temperature in a cooling system for an engine of a motor vehicle is closely controlled for improved engine efficiency and emission. The cooling system may include a radiator as a primary heat exchanger. The cooling system may use an electronically actuated valve to control flow of coolant through the cooling system. However, if the electronically actuated valve becomes stuck in an at least partially closed position and coolant cannot flow to the radiator, coolant in the cooling system may become overheated. An overheated, stagnant coolant may not be able to flow through the engine block and remove heat from the engine block, thereby leading to engine overheating.

The inventors herein have recognized that the issues described above may be addressed by a cooling system valve comprising: a movable element selectively movable between open and closed positions to allow or restrict a flow of coolant through the valve, the movable element comprises a fusible portion configured to melt in order to allow a flow of coolant through the movable element when the fusible portion reaches a threshold temperature, a heating element controllable to heat the fusible portion, and a non-fusible portion, the non-fusible portion extending around a perimeter of the movable element and surrounding the fusible portion, wherein the heating element extends around the perimeter of the movable element.

As an example, a dissolvable (fusible) insert is placed within the movable component of the cooling system valve. At temperatures above a threshold temperature, the insert is in solid state and functions as a single unit with the movable component of the cooling system valve. If the movable component of the valve is stuck in a partially or a fully closed position causing restriction in coolant flow through the valve, coolant temperature upstream of the valve may increase. At the elevated temperature (above the threshold temperature), the insert may dissolve, thereby creating an opening (such as a gate) in the movable component. The stagnated coolant may then flow through the opening. A heating element may be coupled to the insert which may actively heat and melt the insert in response to an increase in engine coolant temperature.

The heating element may be provided in the non-fusible portion of the movable element. The movable element may rotate between the open and closed positions. The valve may further comprise electrical conductors that provide an electrical current to the heating element to selectively heat the heating element. The electrical conductors may pass through a pivot point of the movable element. The fusible portion may be made from a plastics material, such as polypropylene. The cooling system may further comprise a controller configured to selectively activate the heating element so as to melt the fusible portion. The system may further comprise a temperature sensor configured to sense a temperature of coolant in the cooling system. The temperature sensor may be operatively coupled to the controller. The controller may activate the heating element at least partially based on the temperature sensed by the temperature sensor. The temperature sensor may be provided in the engine, cooled by the cooling system.

The cooling system may further comprise an electrically activated actuator configured to move the movable element between the open and closed positions. The electrical conductors for the heating element may also provide power to the actuator. The controller may be configured to selectively provide electrical power below a threshold level that may be sufficient to activate the actuator without melting the fusible portion while electrical power above the threshold level may melt the fusible portion. The actuator may be provided with a fuse that is configured to blow when the controller provides electrical power above the threshold level.

According to another aspect of the present disclosure there is provided a method for a cooling system comprising a valve, the valve comprising a movable element that is selectively movable between open and closed positions to allow or restrict a flow of coolant through the valve, wherein the movable element comprises: a fusible portion configured to melt, in order to allow a flow of coolant through the movable element when the fusible portion reaches a threshold temperature; a heating element controllable to heat the fusible portion; and a non-fusible portion, the non-fusible portion extending around a perimeter of the movable element and surrounding the fusible portion, wherein the heating element extends around the perimeter of the movable element.

In this way, by including a fusible insert in a movable component of a cooling system valve, coolant flow through the valve may be established by melting the insert even when the movable component is stuck in a closed position. The technical effect of using electric power to heat and melt the insert is that melting of the insert may be expedited during conditions when the movable component in stuck closed. By melting the insert and creating an opening in the valve, overheating of the coolant and the engine block may be averted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
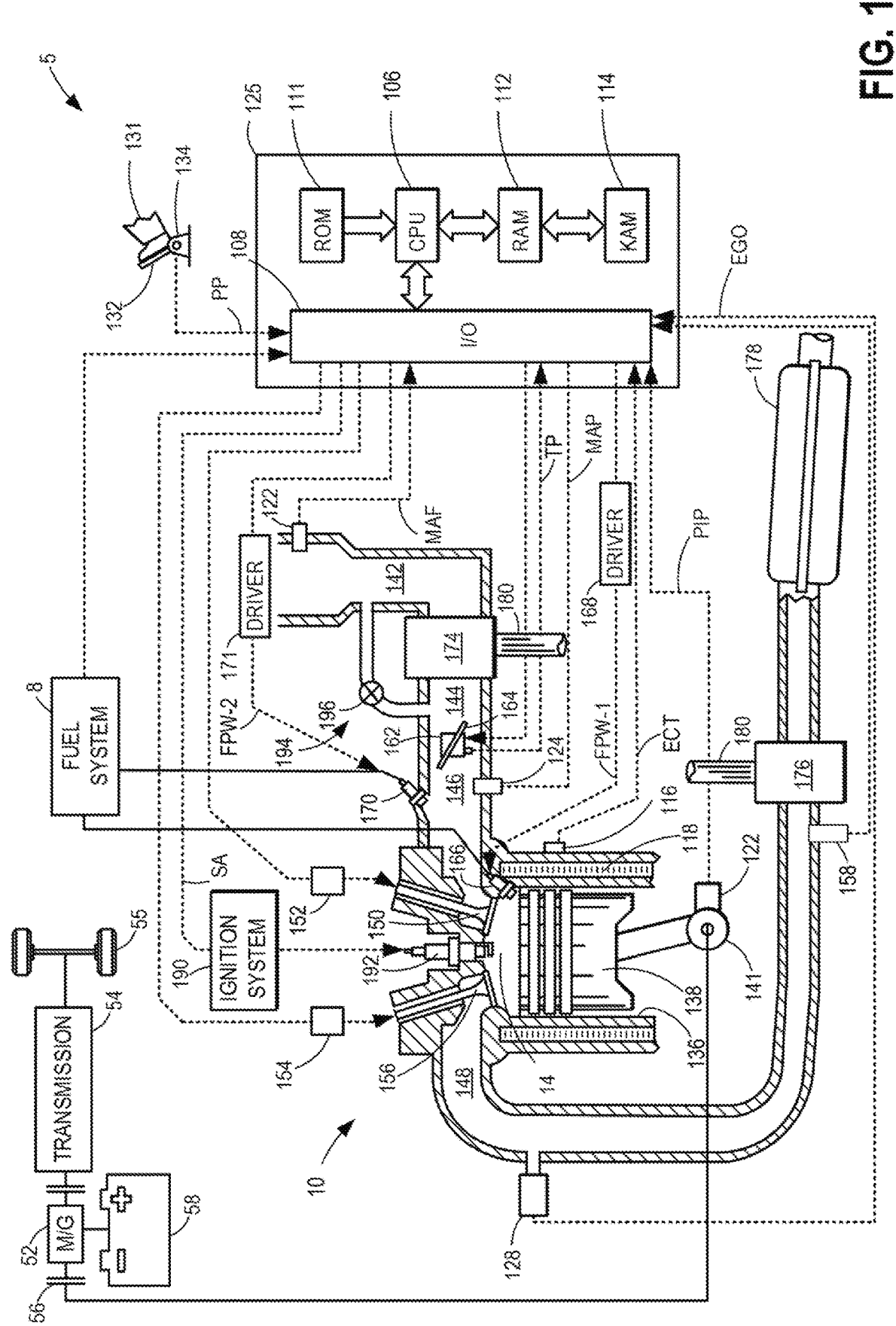
FIG. 1 shows a schematic diagram of an example engine system.
Figure 2:
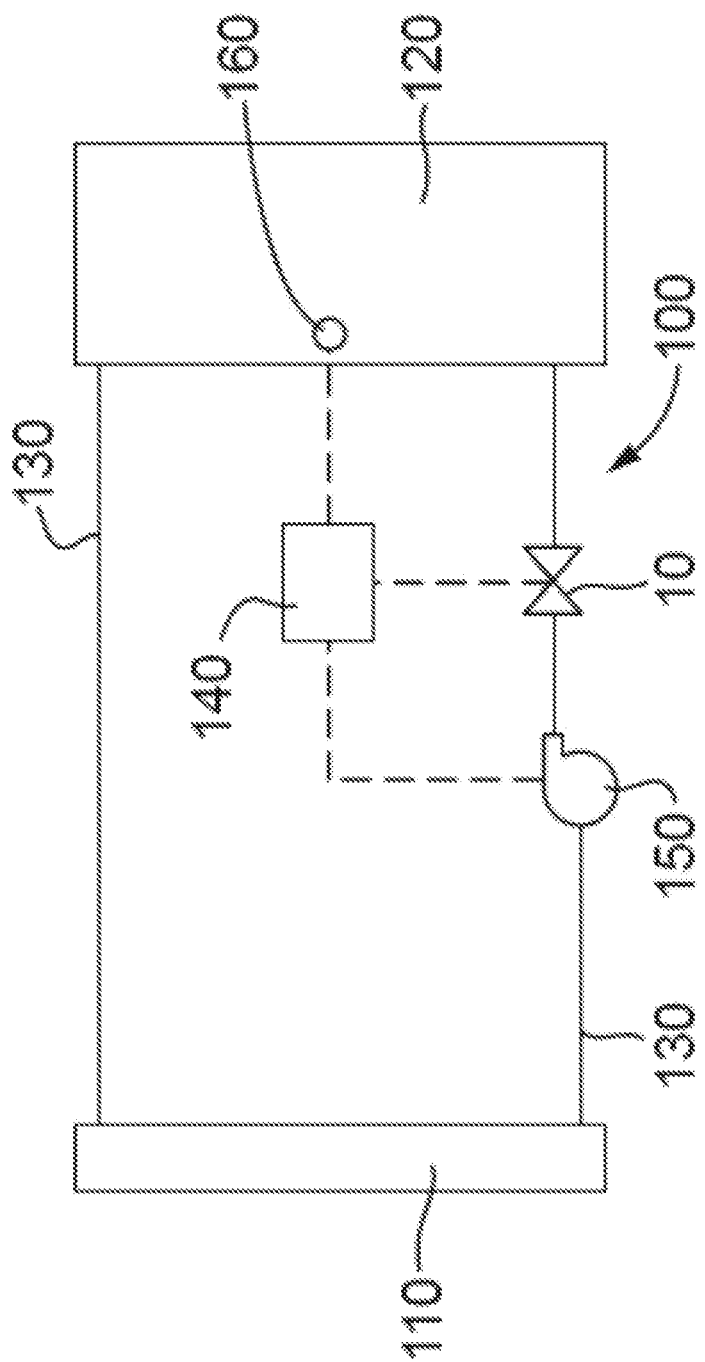
FIG. 2 shows a schematic of an engine cooling system according to an example of the present disclosure.
Figure 5:
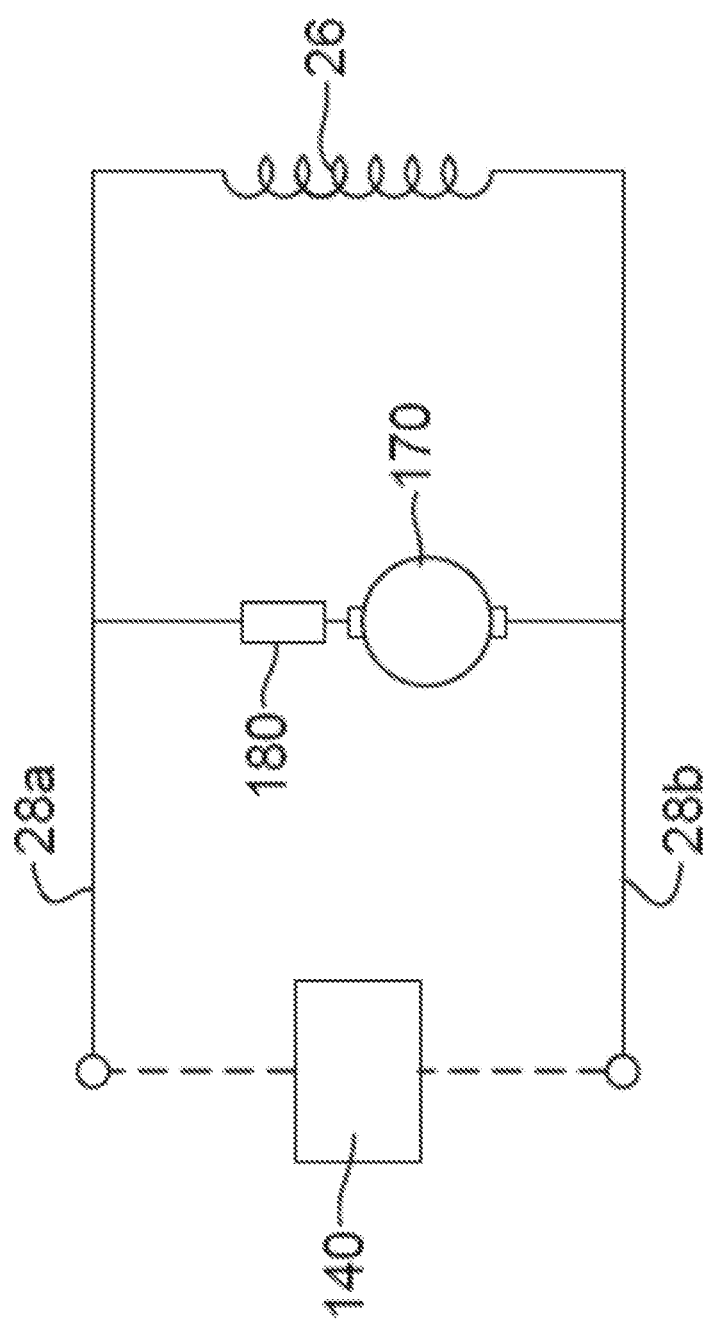
FIG. 5 shows a heating circuit for operating the cooling system valve of FIG. 3.
Figure 6:
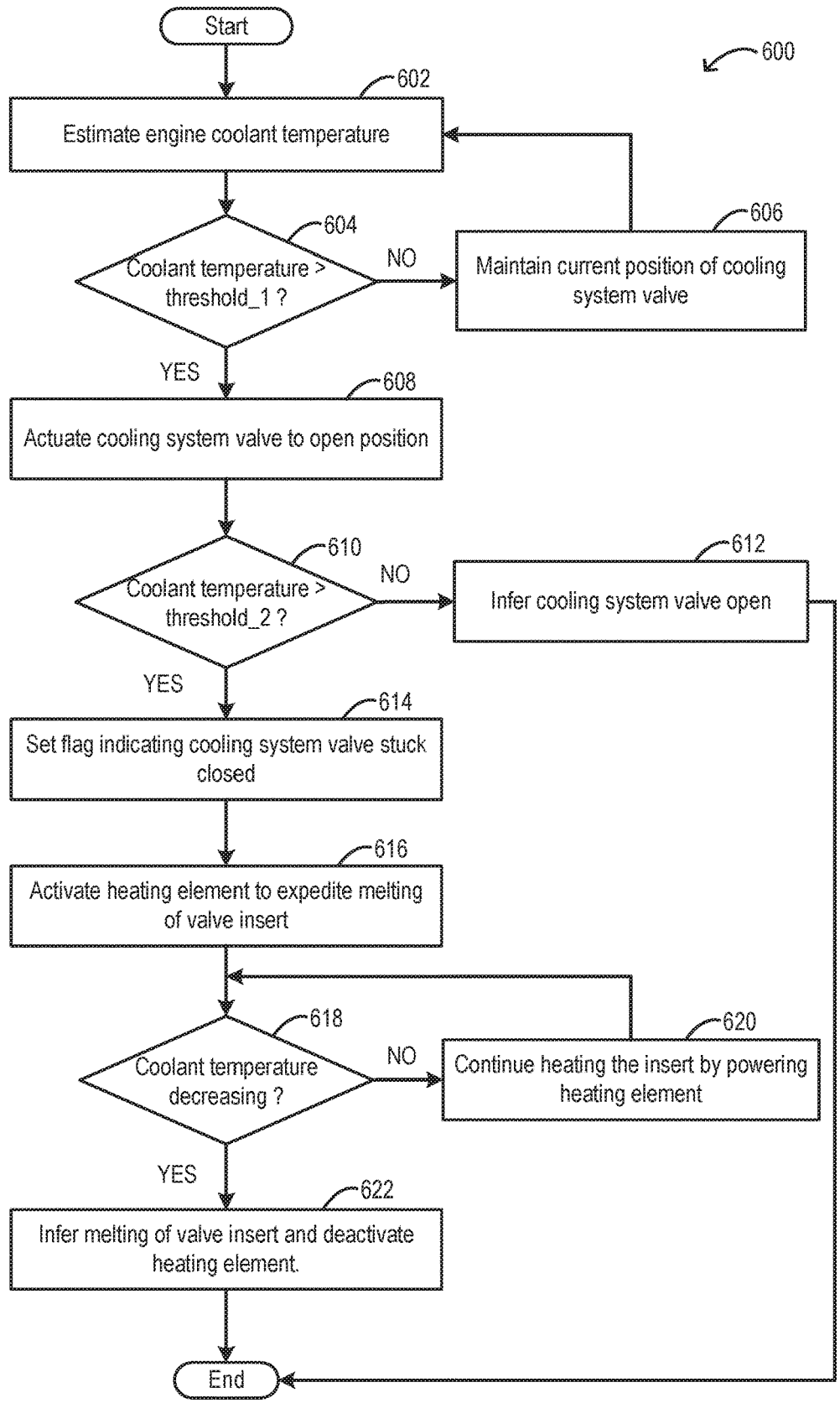
FIG. 6 shows a flowchart illustrating an example operating method that can be implemented to resolve a stuck closed cooling system valve.
Figure 7:
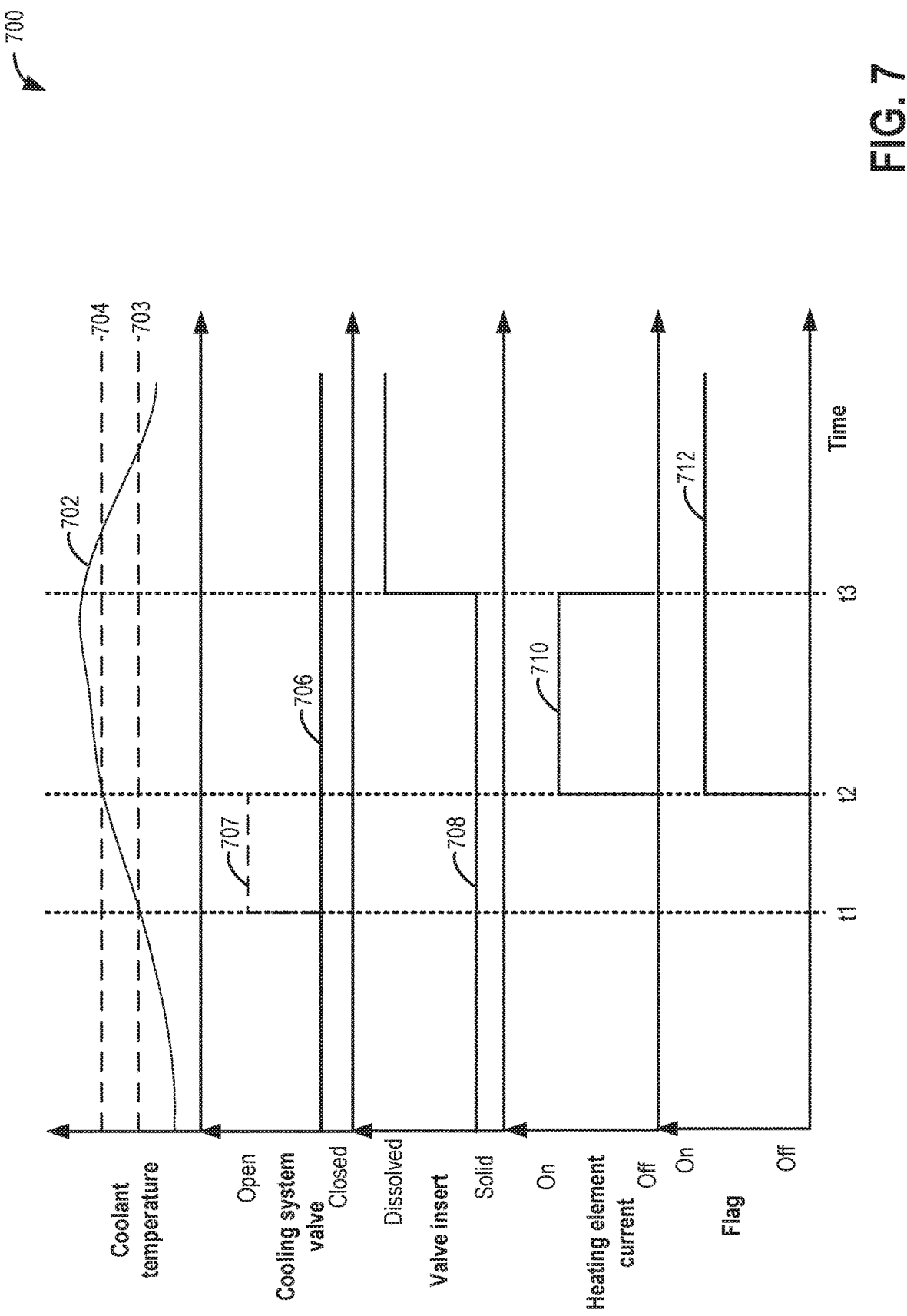
FIG. 7 shows an example operation of the cooling system valve when stuck closed.

The following description relates to systems and methods for operating a cooling system valve comprising a fusible portion and a heating element. The cooling system may be coupled to an engine system, as shown in FIG. 1. The components of the cooling system including the valve is shown in FIG. 2. A perspective view and a side view of the cooling system valve in shown in FIGS. 3 and 4. The actuator of the valve and the heating element is shown in FIG. 5. An example of a routine for operating the cooling system valve when it is stuck in a closed position is depicted in FIG. 6. An example operation of the cooling system valve and the heating element is shown in FIG. 7.

Turning now to FIG. 1, an example of a cylinder 14 of an internal combustion engine 10 is illustrated, which may be included in a vehicle 5. Engine 10 may be controlled at least partially by a control system, including a controller 125, and by input from a vehicle operator 131 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 141 so that reciprocating motion of the piston is translated into rotational motion of the crankshaft. Crankshaft 141 may be coupled to at least one drive wheel 55 of the passenger vehicle via a transmission 54, as described further below. Further, a starter motor (not shown) may be coupled to crankshaft 141 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 141 of engine 10 and electric machine 52 are connected via transmission 54 to vehicle wheels 55 when one or more clutches 56 are engaged. In the depicted example, a first clutch 56 is provided between crankshaft 141 and electric machine 52, and a second clutch 56 is provided between electric machine 52 and transmission 54. Controller 125 may send a signal to an actuator of each clutch 56 to engage or disengage the clutch, so as to connect or disconnect crankshaft 141 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

Intake air passage 142 may include a recirculation passage 194 that allows air to flow around compressor 174, from downstream of compressor 174 to upstream of compressor 174 in a direction opposite of flow through intake air passage 142. As such, when a recirculation valve 196 in the recirculation passage 194 is adjusted open, at least a portion of air compressed by compressor 174 may be returned to an inlet of compressor 174, merging with intake air flowing through intake air passage 142. In one example, the recirculation valve 196 may be a variable flow valve, configured to return excess air flow to an inlet of the compressor 174, decreasing a likelihood of compressor surge, and allowing compressor 174 to operate at mass air flow rates in excess of those demanded by the engine. Recirculation valve 196 may be adjusted between a fully open position and a fully closed position, or configured to be continuously adjustable to any position between the fully open and fully closed positions.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 125 via an actuator 152. Similarly, exhaust valve 156 may be controlled by controller 125 via an actuator 154. The positions of intake valve 150 and exhaust valve 156 may be determined by respective valve position sensors (not shown).

During some conditions, controller 125 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 125 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 125 may input engine operating conditions, including engine speed, engine load, and exhaust gas AFR, into a look-up table and output the corresponding MBT timing for the input engine operating conditions. In other examples the engine may ignite the charge by compression as in a diesel engine.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 125 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 125 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 125 is shown in FIG. 1 as a microcomputer, including a microprocessor unit 106, input/output ports 108, an electronic storage medium for executable programs (e.g., executable instructions) and calibration values shown as non-transitory read-only memory chip 111 in this particular example, random access memory 112, keep alive memory 114, and a data bus. Controller 125 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 121 (or other type) coupled to crankshaft 141; throttle position (TP) from a throttle position sensor; signal EGO from exhaust gas sensor 128, which may be used by controller 125 to determine the AFR of the exhaust gas; and an absolute manifold pressure signal (MAP) from a MAP sensor 124. An engine speed signal, RPM, may be generated by controller 125 from signal PIP. The manifold pressure signal MAP from MAP sensor 124 may be used to provide an indication of vacuum or pressure in the intake manifold. Controller 125 may infer an engine temperature based on the engine coolant temperature and infer a temperature of catalyst 178 based on the signal received from temperature sensor 158.

Controller 125 receives signals from the various sensors of FIG. 1 and employs the various actuators of FIG. 1 to adjust engine operation based on the received signals and instructions stored on a memory of the controller. For example, upon receiving a signal from the engine coolant temperature sensor that engine coolant temperature is higher than a threshold temperature due to an engine cooling system valve being stuck in a closed position, the controller may close a heating circuit to flow current through a heating element coupled to an insert in a cooling system valve. The current flowing through the heating element may heat the fusible insert causing it to melt and creating an opening in the valve for coolant to flow through.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

FIG. 2 shows an example cooling system 200 coupled to the engine system of FIG. 1. The cooling system 200 may comprise a radiator 110, an engine 120 and ducting 130 between the radiator 110 and engine 120. Engine 120 may be engine 10 in FIG. 1. The ducting 130 may permit the flow of coolant between the radiator 110 and engine 120. The valve 101 may be provided in a coolant flow passage associated with the engine cooling system 200, e.g. in the radiator 110, engine 120 or ducting 130 there between. The valve 101 may selectively restrict the flow of coolant through a coolant flow passage. A duct (not shown) may bypass the radiator and facilitate in circulating coolant through the engine without flowing through the radiator (such as during engine warm-up). The valve 101 may be actuated to an open or closed position based on coolant temperature. In one example, during a lower than threshold (first threshold) coolant temperature, the valve 101 may be closed and coolant may be circulated through the engine, bypassing the radiator. In another example, during a higher than threshold (first threshold) coolant temperature, the valve 101 may be opened and coolant may be routed from the engine to the radiator such that the coolant may dissipate heat collected from the engine to the radiator and then the cooled coolant may be routed back to the engine. A pump 150 may selectively circulate coolant in the engine cooling system 200. The pump 150 may be operatively coupled to a controller 140 or another controller. In one example, controller 140 may be the controller 125 in FIG. 1.

The engine cooling system 200 may further comprise a temperature sensor 160 configured to sense a temperature of coolant in the engine cooling system. The temperature sensor 160 may be provided in the engine 120, although the temperature sensor 160 may be provided at other locations, such as in the radiator 110 and/or ducting 130. In one example, temperature sensor 160 may be temperature sensor 116 in FIG. 1 that is coupled to a cylinder cooling sleeve. The temperature sensor 160 may be operatively coupled to the controller 140.

Figure 3:
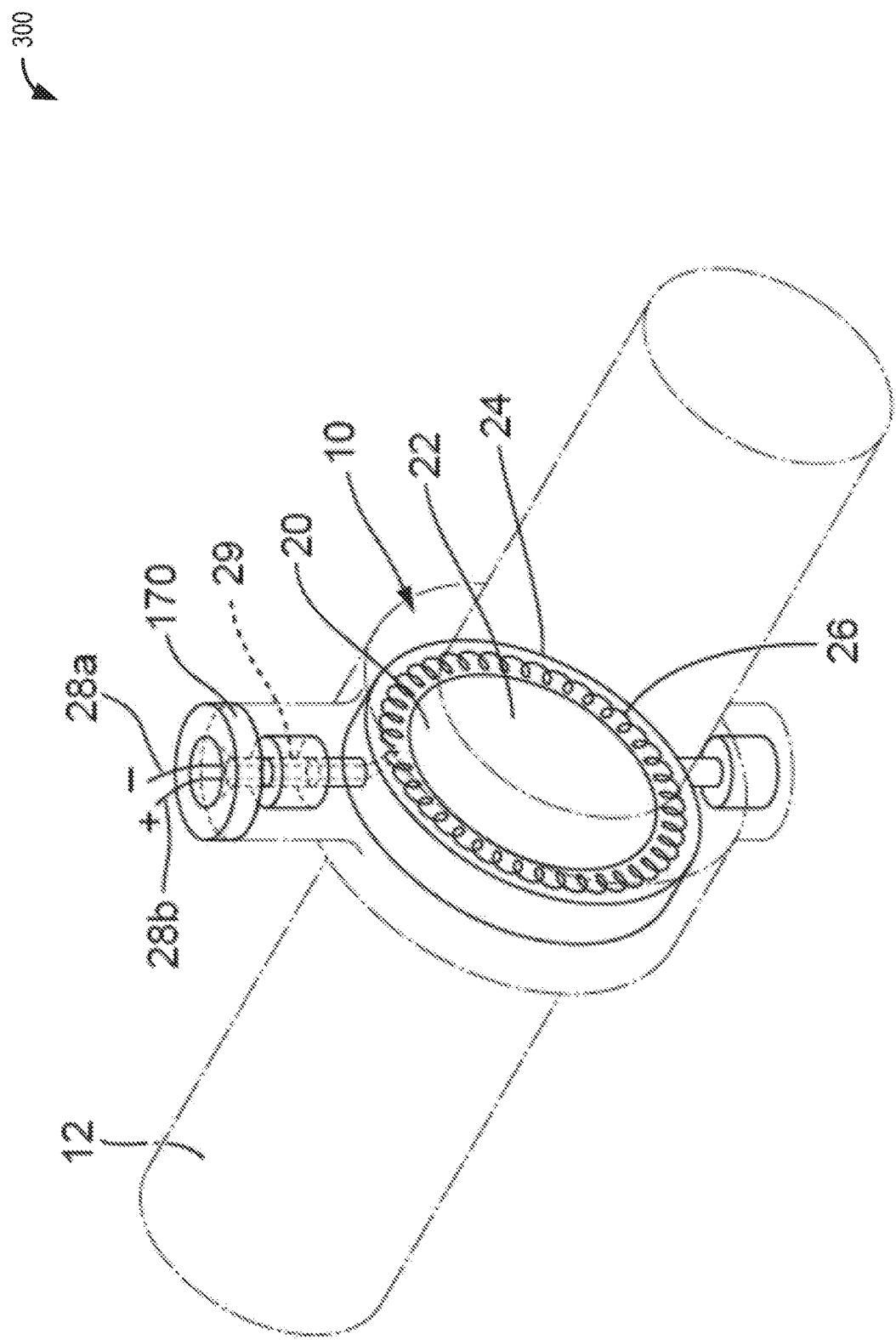
FIG. 3 shows a perspective view of a cooling system valve coupled to the cooling system of FIG. 2.
Figure 4:
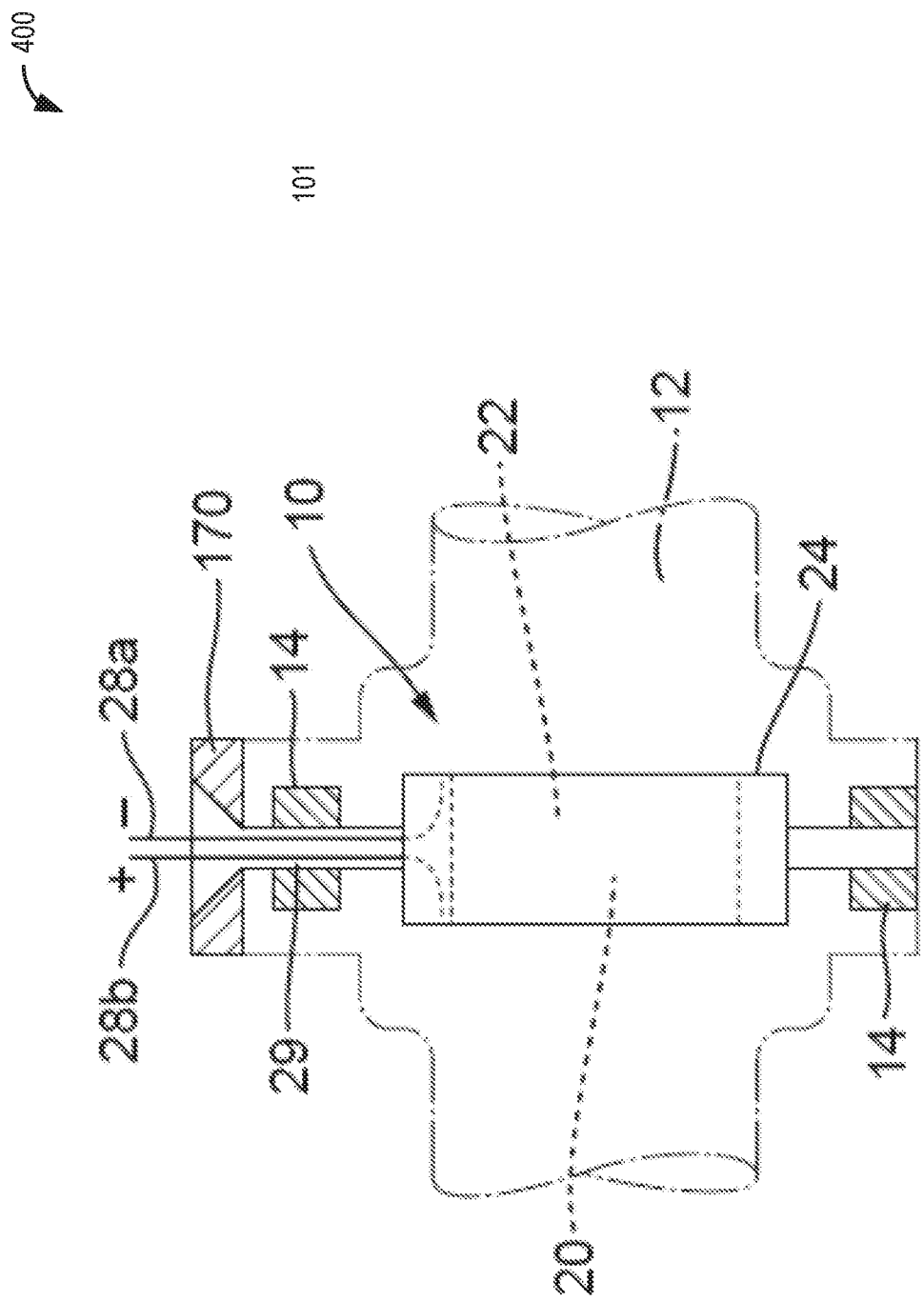
FIG. 4 shows a side view of the cooling system valve of FIG. 3.

FIG. 3 and FIG. 4 elaborates systems and methods for operating the valve 101 of the cooling system 200. FIG. 3 shows a perspective view 300 of the valve 101 and FIG. 4 shows a side view 400 of the valve 101. The valve 101 may be provided in a passage 12 through which coolant for the engine flows. The valve 101 comprises a movable element 20 that is selectively movable, e.g. rotatable, between open and closed positions to allow or restrict a flow of coolant through the valve 101. The movable element 20 may be supported by one or more bearings 14. Valve 101 may be a rotary gate valve, butterfly valve, ball valve or any other type of valve.

The movable element 20 comprises a fusible portion (insert) 22. The fusible portion 22 is configured to melt (e.g. dissolve, disintegrate, decompose or otherwise break up) when the fusible portion exceeds a threshold temperature. The fusible portion 22 is further configured such that once it has melted, a flow of coolant through the movable element is permitted regardless of the position of the movable element 20. As an example, the fusible portion 22 may melt at a temperature between 130° C. and 170° C. By way of example, the fusible portion 22 may be made from a plastics material, such as polypropylene, or any other material with an appropriate melting point temperature. The fusible portion 22 may be absorbed into the coolant once melted.

The movable element 20 additionally comprises a non-fusible portion 24. The non-fusible portion 24 may be made from a material, such as a metal, that does not melt at temperatures likely to be encountered in the engine cooling system 100. In the particular arrangement shown, the non-fusible portion 24 extends around and defines a perimeter of the movable element 20. The non-fusible portion 24 surrounds and may support the fusible portion 22, at least before it has melted. By way of example, the non-fusible portion 24 may define an opening, which may be circular, and the fusible portion 22 may fit within the opening. The fusible and non-fusible portions 22, 24 may interlock (e.g. with a tongue and groove type arrangement) and they may snap-fit together during assembly.

The movable element 20 further comprises a heating element 26. The heating element 26 is controllable to heat the fusible portion 22. By way of example, the heating element 26 may be adjacent to the fusible portion 22. In particular, the heating element 26 may be provided in the non-fusible portion 24 of the movable element. The heating element 26 extends around the perimeter of the movable element 20.

The heating element 26 may be in the form of an electrical resistor through which an electrical current may pass so as to provide heat. The valve 101 may further comprise electrical conductors 28a, 28b that provide the electrical current to the heating element 26 to selectively heat the heating element. The electrical conductors 28a, 28b may extend and pass through a pivot point 29 of the movable element 20 about which the movable element rotates, such as at the bearings 14. The electrical connectors 28a, 28b may then connect to a source of electrical current, such as a battery or any other source of electrical current. The electrical connectors 28a, 28b may connect to the source of electrical current via a switch, such as a relay, transistor, or any other type of switch. The switch may be part of or controlled by a controller 140.

During a first condition, a position of a movable element 20 of a cooling system valve 101 may be actuated to a fully open position and during a second condition, electric current may be routed through the heating element 26 coupled to a fusible insert 22 housed in the movable element 20. The first condition includes a higher than first threshold coolant temperature and the second condition includes a higher than second threshold coolant temperature with the movable element 20 actuated to the fully open position, wherein the first threshold coolant temperature is lower than the second threshold coolant temperature and wherein the second threshold coolant temperature is lower than a coolant boiling temperature. During the second condition, the electric current flow is continued until the coolant temperature reduces to below the second threshold coolant temperature indicating melting of the fusible insert.

FIG. 5 shows an example electrical circuit 500 for operating the cooling system valve 101 of FIGS. 2-4. The valve 101 may comprise an electrically activated actuator 170 configured to move the movable element between the open and closed positions. The actuator 170 may comprise a motor or any other rotary or linear actuator. The actuator 170 may be operatively coupled to the controller 140 or another controller. The controller 140 (or other controller) may selectively open or close the valve depending on the operating conditions, e.g. temperature, of the engine cooling system 100.

The electrical conductors 28a, 28b for the heating element 26 may also provide power to the actuator 170. As shown, the actuator 170 and heating element 26 may be provided in a parallel arrangement, although it is also envisaged that they may be provided in a series arrangement. The controller 140 may be configured to selectively provide electrical power below a threshold level that may be sufficient to activate the actuator 170 without melting the fusible portion 22. The controller 140 may also provide electrical power above the threshold level at which the fusible portion 22 may melt. In this way, a single pair of electrical connectors 28a, 28b may be provided for the valve 10. However, it is also envisaged that separate electrical connectors for the actuator 170 and heating element 26 may be provided.

The actuator 170 may be provided with a fuse 180 that is configured to blow when the controller 140 provides electrical power above the threshold level so as to protect the actuator 170 from excessive power levels. As depicted, the actuator 170 and fuse 180 may be provided in a series arrangement.

As an example, the controller 140 may activate the heating element 26 at least partially based on the temperature sensed by the temperature sensor coupled to the cooling system. If the cooling system valve is stuck in an at least partially closed position, accumulation of coolant upstream of the valve may cause coolant temperature to increase. For example, if the controller 140 determines that the temperature of the coolant detected by the temperature sensor exceeds a threshold temperature, the controller 140 may activate the heating element 26 to heat and melt the fusible portion. By melting the fusible portion, an opening is created in the valve which allows the stagnated coolant to flow through the valve even though the valve is stuck in an at least partially closed position. In this way, coolant valve operation may be maintained and coolant overheating (and consequent engine overheating) may be averted.

The cooling system valve may permit the flow of coolant if the valve becomes stuck in the closed position and the coolant exceeds a threshold temperature. Thus, if the valve develops a fault (degraded), the coolant may continue to flow and the engine may be prevented from overheating. Furthermore, the heating element may increase the rate at which the fusible portion melts and the fusible portion can be melted depending on the temperature of the coolant elsewhere. For example, the temperature of the coolant at the valve may not increase as rapidly as the coolant in the engine, as coolant flow may stagnate in the region of the valve if it is stuck.

As mentioned above, the valve 101 may be provided in a cooling system for an engine. However, it is also envisaged that the valve 101 may be provided in other cooling systems, such as a battery cooling system.

FIG. 6 shows an example method 600 that can be implemented to resolve a stuck closed cooling system valve (such as valve 101 in FIG. 2). Instructions for carrying out method 600 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 602, engine coolant temperature in the coolant system may be estimated based on feedback from the coolant system sensor (such as sensor 16 in FIG. 2). In one example, the coolant temperature sensor may be coupled to the engine and may record the temperature of coolant exiting the engine. At 604, the routine includes determining if the coolant temperature is higher than a first threshold temperature (threshold_1). The first threshold temperature may be calibrated to correspond to a temperature at which the coolant flowing out of the engine may be routed to the radiator such that the coolant may dissipate engine heat. If the coolant is unable to flow through the radiator and dissipate heat (collected from engine), the coolant may become over heated causing the engine to overheat. If it is determined that the engine coolant temperature is lower than the first threshold temperature, at 606, a coolant system valve (such as valve 101 in FIG. 2) controlling coolant flow through the engine and the radiator may be maintained in its current position. In one example, the current position may be a closed position wherein the coolant is circulated through the engine, bypassing the radiator. In another example, the current position may be a partially or completely open position allowing the coolant to circulate through each of the engine and the radiator.

If it is determined that the coolant temperature is higher than the first threshold, it may be inferred that heat dissipation of the coolant (at the radiator) upstream of the valve is desired, and at 608, the controller may send a signal to an actuator coupled to the valve to actuate the cooling system valve to an open position. In one example, the valve may be actuated to a completely open position to route the entire volume of coolant from the engine to the radiator wherein the coolant may dissipate its heat.

At 610, the routine includes determining if the coolant temperature is higher than a second threshold temperature (threshold_2). The second threshold temperature may be calibrated based on coolant characteristics such as boiling point. The second threshold temperature may be higher than the first threshold temperature but lower than the coolant boiling point. If it is determined that the coolant temperature is lower than the second threshold temperature, at 612, it may be inferred that the cooling system valve is in an open position thereby allowing coolant to flow from the engine to the radiator and dissipate heat collected from the engine resulting in lowering of coolant temperature.

However, at 610, if it is determined that the coolant temperature is higher than the second threshold, it may be inferred that even after actuating the cooling system valve, the valve has not opened, thereby further stagnating coolant upstream of the valve. At 614, a flag (diagnostics code) may be set indicating that the cooling system valve is stuck in an at least partially closed position. A dashboard light (such as a check engine light) may indicate the diagnostic code. The temperature of the coolant in the loop increases since after collecting heat from the engine, the entire volume of coolant flowing out of the engine may not be able to flow to the radiator to dissipate the heat. However, if the heat is not dissipated to the radiator, the coolant may be overheated and reach its boiling point. Also, a hot coolant may not be effective in removing engine heat, thereby causing engine overheating.

At 616, a heating element (such as heating element 26 in FIG. 3) coupled to a fusible insert (such as fusible portion in FIG. 3) in the cooling system valve may be activated to expedite melting of the valve insert. The heat from the stagnated coolant upstream of the valve may be conducted to the fusible material causing the fusible material to heat up. However, heat from the coolant may not be sufficient in melting the insert in a timely manner to reinstate coolant flow to the radiator. Therefore, the controller may actuate a switch to close a circuit of the heating element such that current from a source (such as an on-board battery) may flow through the heating element. The heating element may surround the fusible insert in the valve and the current flowing through the heating element may accelerate heating of the fusible portion. Upon reaching the melting point of the material forming the fusible portion, the insert may melt, thereby creating an opening (window) in the stuck movable element of the valve.

At 618, the routine includes determining if the coolant temperature is decreasing. As the window in the valve is created, coolant from upstream of the valve may flow to the radiator through the window. As the coolant flows to the radiator, heat from the coolant is dissipated and the coolant temperature may decrease to below the second threshold temperature. If it is determined that the coolant temperature has not yet started decreasing, at 620, it may be inferred that the opening has not yet been created and heating of the fusible insert may be continued by powering (flowing current) the heating element surrounding the insert until the insert melts.

If it is determined that coolant temperature is decreasing (such as to below the second threshold temperature), at 622, it may be inferred that the fusible insert in the valve has melted and coolant is being routed to the radiator via the valve, and further heating of the heating element may not be desired. Hence the controller may send a signal to the switch of the electric circuit to actuate the switch to an open position and stop current flow through the heating element (deactivating the heating element). In this way, by actively heating the valve insert and creating an opening in the cooling system valve, coolant overheating, and engine overheating may be averted.

FIG. 7 shows an example timeline 700 illustrating synchronous operation of a cooling system valve (such as valve 101 in FIG. 2) when stuck in a closed position. The horizontal (x-axis) denotes time and the vertical markers t1-t3 identify significant times in the routine for cooling system operation.

The first plot, line 702, shows a variation in coolant temperature as estimated via an engine coolant temperature sensor. Dashed line 703 denotes a first threshold coolant temperature above which the coolant is desired to be routed to a radiator for dissipation of heat. Dashed line 704 denotes a second threshold temperature above which melting of a fusible insert in the cooling system may be initiated to avert coolant and engine overheating. The second plot, line 706, shows a position of the cooling system valve. The third plot, line 708, shows if a fusible insert in the cooling system valve is in a solid state or has dissolved. When the insert has dissolved, an opening is created in the movable element of the valve. The fourth plot, line 710, shows if current is flowing through a heating element surrounding the fusible insert in the valve. The fifth plot, line 712, denotes a position of a flag indicating that the valve is stuck in a closed position.

Prior to time t1, the coolant temperature remains below each of the first threshold temperature and the second coolant temperature. The cooling system valve is maintained in a closed position and the coolant is circulated through the engine without being routed to the radiator. Current is not flowing through the heating element and the valve insert is in the solid state. The flag is maintained in the off state.

At time t1, the coolant temperature increases to above the first threshold and dissipation of heat from the coolant is desired. Therefore, the controller sends a signal to the cooling system valve to actuate the valve to an open position. Dashed line 706 shows the open position of the valve.

However, at time t2, in response to the coolant temperature increasing (instead of decreasing) to the second threshold temperature, it is inferred that even though the valve was actuated to the open position, it is actually stuck in the closed position. A flag is set to indicate degradation of the cooling system valve. Also, in order to melt the fusible insert in the valve and allow coolant flow through the valve, current is routed through the heating element to heat the valve insert. Heating of the insert is carried out between time t2 and time t3.

At time t3, in response to the coolant temperature decreasing, it is inferred that the valve insert has dissolved, thereby creating an opening in the valve and allowing coolant to flow to the radiator for heat dissipation. After time t3, due to heat dissipation, coolant temperature gradually decreases.

In this way, in response to a coolant temperature increasing to above a threshold temperature, a fusible insert in a cooling system valve may be actively heated by flowing electric current through an electric heating element coupled to the fusible insert, at least until the fusible insert melts.

An example cooling system valve comprises: a movable element selectively movable between open and closed positions to allow or restrict a flow of coolant through the valve, the movable element comprises a fusible portion configured to melt in order to allow a flow of coolant through the movable element when the fusible portion reaches a threshold temperature, a heating element controllable to heat the fusible portion, and a non-fusible portion, the non-fusible portion extending around a perimeter of the movable element and surrounding the fusible portion, wherein the heating element extends around the perimeter of the movable element. In any preceding example, additionally or optionally, the heating element is provided in the non-fusible portion of the movable element. Any or all of the preceding examples, further comprising, additionally or optionally, electrical conductors that provide an electrical current to the heating element to selectively heat the heating element, the electrical conductors passing through a pivot point of the movable element. In any or all of the preceding examples, additionally or optionally, the fusible portion is made from a plastics material. In any or all of the preceding examples, additionally or optionally, the fusible portion is made from polypropylene. In any or all of the preceding examples, additionally or optionally, the system further comprises a controller storing instructions in non-transitory memory executable to: selectively activate the heating element to melt the fusible portion. Any or all of the preceding examples, further comprising, additionally or optionally, a temperature sensor configured to sense a temperature of coolant in the cooling system, the temperature sensor being operatively coupled to the controller, and wherein the controller includes further instruction to activate the heating element based on the temperature sensed by the temperature sensor. Any or all of the preceding examples, further comprising, additionally or optionally, an electrically activated actuator configured to move the movable element between the open and closed positions, wherein the electrical conductors for the heating element also provide power to the actuator, and wherein the controller is configured to selectively provide electrical power each of a below a threshold level to activate the actuator without melting the fusible portion and above the threshold level to melt the fusible portion.

Another engine example method comprises: in response to a coolant temperature increasing to above a threshold temperature, actively heating a fusible insert in a cooling system valve by flowing electric current through an electric heating element coupled to the fusible insert, at least until the fusible insert melts. In any preceding example, additionally or optionally, the fusible insert is housed within a movable element of the valve, and upon melting of the fusible insert, an opening is created in the movable element. In any or all of the preceding examples, additionally or optionally, a position of the movable element is adjusted to regulate coolant flow from an engine to a radiator, the movable element including the fusible portion surrounded by a non-fusible portion. Any or all of the preceding examples, further comprising, additionally or optionally, in response to the coolant temperature increasing to above another threshold temperature, actuating the movable element to a fully open position, the another threshold temperature lower than the threshold temperature. Any or all of the preceding examples, further comprising, additionally or optionally, setting a diagnostic code indicating degradation of the cooling system valve in response to coolant temperature increasing above the threshold temperature after actuation of the movable element to the fully open position. In any or all of the preceding examples, additionally or optionally, melting of the fusible insert is inferred based on a decrease in coolant temperature to below the threshold temperature during heating of the fusible insert. In any or all of the preceding examples, additionally or optionally, the electric heating element extends around a perimeter of the movable element and electric conductors passing through a pivot point of the movable element supplies electric power to the heating element.

In yet another example, an engine method, comprises: during a first condition, actuating a position of a movable element of a cooling system valve to a fully open position; and during a second condition, flowing electric current through a heating element coupled to a fusible insert housed in the movable element. In any preceding example, additionally or optionally, the first condition includes a higher than first threshold coolant temperature and the second condition includes a higher than second threshold coolant temperature with the movable element actuated to the fully open position, wherein the first threshold coolant temperature is lower than the second threshold coolant temperature and wherein the second threshold coolant temperature is lower than a coolant boiling temperature. In any or all of the preceding examples, additionally or optionally, the electric current is routed via a set of electric conductors coupled to each of the heating element and an actuator of the movable element. In any or all of the preceding examples, additionally or optionally, the cooling system valve is housed in a coolant system passage fluidically coupling an engine to a radiator, the coolant system passage further including an engine coolant temperature sensor for estimating coolant temperature. In any or all of the preceding examples, additionally or optionally, during the second condition, the electric current flow is continued until the coolant temperature reduces to below the second threshold coolant temperature indicating melting of the fusible insert.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cooling system valve comprising:
a movable element selectively movable between open and closed positions to allow or restrict a flow of coolant through the valve,
the movable element comprises a fusible portion configured to melt in order to allow a flow of coolant through the movable element when the fusible portion reaches a threshold temperature, a heating element controllable to heat the fusible portion, and a non-fusible portion, the non-fusible portion extending around a perimeter of the movable element and surrounding the fusible portion,
wherein the heating element extends around the perimeter of the movable element.

2. The cooling system valve of claim 1, wherein the heating element is provided in the non-fusible portion of the movable element.

3. The cooling system valve of claim 1, further comprising electrical conductors that provide an electrical current to the heating element to selectively heat the heating element, the electrical conductors passing through a pivot point of the movable element.

4. The cooling system valve of claim 1, wherein the fusible portion is made from a plastics material.

5. The cooling system valve of claim 1, wherein the fusible portion is made from polypropylene.

6. The cooling system of claim 1, wherein the system further comprises a controller storing instructions in non-transitory memory executable to: selectively activate the heating element to melt the fusible portion.

7. The cooling system of claim 6, further comprising a temperature sensor configured to sense a temperature of coolant in the cooling system, the temperature sensor being operatively coupled to the controller, and wherein the controller includes further instruction to activate the heating element based on the temperature sensed by the temperature sensor.

8. The cooling system of claim 3, further comprising an electrically activated actuator configured to move the movable element between the open and closed positions,
wherein the electrical conductors for the heating element also provide power to the actuator, and
wherein the controller is configured to selectively provide electrical power each of a below a threshold level to activate the actuator without melting the fusible portion and above the threshold level to melt the fusible portion.

9. An engine method, comprising:
in response to a coolant temperature increasing to above a threshold temperature, actively heating a fusible insert in a cooling system valve by flowing electric current through an electric heating element coupled to the fusible insert, at least until the fusible insert melts, wherein the fusible insert is housed within a movable element of the valve, and upon melting of the fusible insert, an opening is created in the movable element, wherein a position of the movable element is adjusted to regulate coolant flow from an engine to a radiator, the movable element including the fusible portion surrounded by a non-fusible portion.

10. The method of claim 9, further comprising, in response to the coolant temperature increasing to above another threshold temperature, actuating the movable element to a fully open position, the another threshold temperature lower than the threshold temperature.

11. The method of claim 9, further comprising, setting a diagnostic code indicating degradation of the cooling system valve in response to coolant temperature increasing above the threshold temperature after actuation of the movable element to the fully open position.

12. The method of claim 9, wherein melting of the fusible insert is inferred based on a decrease in coolant temperature to below the threshold temperature during heating of the fusible insert.

13. An engine method, comprising:
in response to a coolant temperature increasing to above a threshold temperature, actively heating a fusible insert in a cooling system valve by flowing electric current through an electric heating element coupled to the fusible insert, at least until the fusible insert melts, wherein the fusible insert is housed within a movable element of the valve, and upon melting of the fusible insert, an opening is created in the movable element, wherein the electric heating element extends around a perimeter of the movable element and electric conductors passing through a pivot point of the movable element supplies electric power to the heating element.

14. The method of claim 13, further comprising, in response to the coolant temperature increasing to above another threshold temperature, actuating the movable element to a fully open position, the another threshold temperature lower than the threshold temperature.

15. The method of claim 13, further comprising, setting a diagnostic code indicating degradation of the cooling system valve in response to coolant temperature increasing above the threshold temperature after actuation of the movable element to the fully open position.

16. The method of claim 13, wherein melting of the fusible insert is inferred based on a decrease in coolant temperature to below the threshold temperature during heating of the fusible insert.

* * * * *